US006181577B1

(12) United States Patent
Chen et al.

(10) Patent No.: US 6,181,577 B1
(45) Date of Patent: Jan. 30, 2001

(54) AUXILIARY BIAS CIRCUIT FOR A POWER SUPPLY AND A METHOD OF OPERATION THEREOF

(75) Inventors: Shiaw-Jong Steve Chen; Feng Lin, both of Plano, TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/360,563

(22) Filed: Jul. 26, 1999

(51) Int. Cl.[7] .................................................. H02M 3/335
(52) U.S. Cl. ............................................................ 363/21
(58) Field of Search ................................. 363/16, 20, 21, 363/95, 97, 131

(56) References Cited

U.S. PATENT DOCUMENTS

| | | | |
|---|---|---|---|
| 4,323,957 | * 4/1982 | Clark, Jr. et al. | 363/21 |
| 4,447,866 | * 5/1984 | Reeves | 363/21 |
| 4,635,179 | 1/1987 | Carstem | 363/70 |
| 4,670,325 | 6/1987 | Bakos et al. | 428/209 |
| 4,810,563 | 3/1989 | DeGree et al. | 428/209 |
| 5,365,403 | 11/1994 | Vinciarelli et al. | 361/707 |
| 5,468,661 | 11/1995 | Yuan et al. | 437/40 |
| 5,526,234 | 6/1996 | Vinciarelli et al. | 361/740 |
| 5,590,032 | 12/1996 | Bowman et al. | 363/15 |
| 5,642,276 | 6/1997 | Lotfi et al. | 363/144 |
| 5,644,481 | * 7/1997 | Konishi et al. | 363/21 |
| 5,654,879 | * 8/1997 | Lopez et al. | 363/16 |
| 5,659,462 | 8/1997 | Chen et al. | 363/21 |
| 5,663,869 | 9/1997 | Vinciarelli et al. | 361/707 |
| 5,663,874 | * 9/1997 | Mader et al. | 363/21 |
| 5,835,360 | * 11/1998 | Jansen | 363/21 |

OTHER PUBLICATIONS

Douglas Dromgoole, Ashraf Lotfi, Anatoly Feygenson, Robert Frye, Byung J. Han, King Tai; "The Application of Silicon–on–Silicon MCMs to Advanced Analog Power Controllers"; IEEE Feb. 1996; pp. 55–60.

Robert C. Frye, King L. Tai, Maureen Y. Lau, Albert W. C. Lin; "Silicon–on–Silicon MCMs with Integrated Passive Components"; IEEE May 1992; pp. 155–158.

Carl Blake, Dan Kinzer, Peter Wood; "Synchronous Rectifiers Versus Schottky Diodes: A Comparison of the Losses of a Synchronous Rectifier Versus the Losses of a Schottky Diode Rectifier"; IEEE Feb. 1994; pp. 17–23.

Van A. Niemela, Wayne C. Bowman; "Comparison of GaAs and Silicon Synchronous Rectifiers in a 3.3V out, 50W DC–DC Converter"; IEEE Jul. 1996; pp. 861–867.

D. L. Plumton, H. T. Yuan, T. S. Kim, A. H. Taddiken, V. Ley, R. L. Kollman, I. Lagnado, and L. Johnson; "A Low On–Resistance, High–Current GaAs Power VFET"; IEEE Apr. 1995; pp. 142–144.

Robert Kollman, Greg Collins, Don Plumton; "10 Mhz PWM Converters with GaAs VFETs"; IEEE Mar. 1996, pp. 264–269.

Robert Kollman, Guy Sills, James Yuan, Tsengyou Syau, Prasad Venkatraman, B. Jayant Baliga; "A Comparison of Silicon UMOSFETs Versus GaAs Vertical FETs for low Voltage, Synchronous Rectification at 2.5 Mhz"; HFPC May 1992; pp. 112–123.

* cited by examiner

*Primary Examiner*—Matthew Nguyen

(57) ABSTRACT

For use in a power supply having a bias circuit with a bias transformer, an auxiliary bias circuit and a method of providing power via the auxiliary bias circuit to an auxiliary load. In one embodiment, the auxiliary bias circuit includes a blocking device coupled to the bias transformer. The auxiliary bias circuit also includes a storage device, coupled to the blocking device and across the bias transformer, that provides a voltage to drive the auxiliary load without requiring a separate power supply.

20 Claims, 3 Drawing Sheets

AUXILIARY BIAS CIRCUIT FOR A POWER SUPPLY AND A METHOD OF OPERATION THEREOF

CROSS-REFERENCE TO RELATED APPLICATIONS

This application is related to U.S. Pat. No. 6,061,260 entitled "A Board Mounted Power Supply Having an Auxiliary Output," to Chen, et al, filed on Aug. 19, 1998, which is commonly assigned with the present invention and incorporated herein by reference as if reproduced herein in its entirety.

TECHNICAL FIELD OF THE INVENTION

The present invention is directed, in general, to power supplies and, more specifically, to an auxiliary bias circuit for a power supply and a method of operation thereof.

BACKGROUND OF THE INVENTION

The electronics industry continues to develop smaller and more powerful equipment that performs many functions which, in turn, require more power. In many cases, auxiliary devices that perform one or more additional functions are associated with such equipment. The auxiliary devices also draw power to perform their intended functions and may require a different voltage than the equipment with which they are associated. Consequently, to provide the power to the main and auxiliary components (sometimes with two or more voltage ranges), two separate power supplies are often employed. More specifically, a main power supply powers the main components and an auxiliary power supply powers the auxiliary components.

While the auxiliary power supply provides a viable solution to power auxiliary devices associated with electronic equipment, there are several drawbacks to such an approach. An additional power supply adds complexity to the electronic equipment in connection with, for instance, the added wiring and circuitry. Of course, any time an additional component is added to electronic equipment, provision must be made to accommodate the larger volume of space associated with the additional component and the increased component cost. In addition, the excess heat generated by the additional power supply can reduce the overall efficiency and reliability of the electronic equipment. In short, adding an auxiliary power supply to electronic equipment generally runs afoul of the industry goal of producing smaller and more efficient electronic systems.

The telecommunications industry is but one environment whereby the power requirements for electronic equipment, such as voice processors and switching equipment, are becoming more demanding. The electronic system frequently consists of several circuit boards housed in a common cabinet. A single board mounted power module (BMPM) often is employed to power all of the equipment in the cabinet.

As a general rule, a smaller BMPM is desirable to use less cabinet space and to allow for a more compact and smaller power supply. Although a smaller BMPM is desirable, more powerful BMPMs are also necessary to supply power to a large number of components. BMPM performance is generally evaluated according to its power density, which is the ratio of the total power output to the total volume of the BMPM. The highest power density (i.e., the smallest volume with the largest possible power output) attainable is the goal. As a practical matter, however, the power density is limited because, as the power output increases additional heat is generated thereby detracting from the efficiency of the power supply. The excess heat also reduces the reliability of the power supply caused by premature component failures. For instance, for every 10° C. increase in operating temperature for the power supply, the mean time between failures generally decreases by a factor of two. With the use of more powerful BMPMs, a concurrent need exists to remove the additional heat generated therefrom.

Presently, finned heat sinks are used with the power supplies to dissipate the heat generated by the BMPMs. Conventional finned heat sinks with external air flow, however, cannot remove enough heat to allow a significant increase in the power density of the BMPMs. To achieve additional heat dissipation, a larger heat sink may be employed, but the larger heat sink effectively lowers the power density of the BMPMs.

In many computer applications, a heat sink and fan assembly are employed to significantly increase heat dissipation capability associated with the power supply. Other active cooling or heat dissipation methods are also available, but provisions must be made to accommodate the additional power to operate the active cooling equipment. The active cooling or heat dissipation equipment is particularly attractive in the telecommunications industry, if the costs and complexity associated with such designs can be managed.

Accordingly, what are needed in the art is a system and method of providing power to auxiliary components, such as active cooling devices, without appreciably adding to the overall complexity of the electronic equipment.

SUMMARY OF THE INVENTION

To address the above-discussed deficiencies of the prior art, the present invention provides for use in a power supply having a bias circuit with a bias transformer, an auxiliary bias circuit and a method of providing power via the auxiliary bias circuit to an auxiliary load. In one embodiment, the auxiliary bias circuit includes a blocking device coupled to the bias transformer. The auxiliary bias circuit also includes a storage device, coupled to the blocking device and across the bias transformer, that provides a voltage to drive the auxiliary load without requiring a separate power supply. The present invention, in one aspect, introduces the concept of modifying and boosting the bias circuitry of a power supply (e.g., a board mounted power module) to provide an additional bias circuit to power an auxiliary load.

In one embodiment of the present invention, the bias circuit further includes a switch. The switch is adapted to provide a self-pulsed gate-drive signal to the bias transformer. While the switch enhances the operation of the bias circuit, it is not necessary to practice the present invention.

In one embodiment of the present invention, the blocking device is a diode. In a related, but alternative embodiment, the storage device is a capacitor. Of course, other blocking or storage devices are well within the broad scope of the present invention.

In one embodiment of the present invention, the auxiliary load includes an active cooling device for a heat sink assembly. In related, but alternative embodiments, the active cooling device includes a fan or a liquid cooling pump. The auxiliary bias circuit can, therefore, be advantageously used to power any one of a number of cooling or other devices associated with a power supply.

One advantageous embodiment of the present invention, to be illustrated and described, is a power supply having a power train with an input couplable to an electrical power source and a DC output couplable to an electrical load. The power supply includes (1) a main switch coupled to the input, (2) a transformer coupled to the main switch, (3) a rectifier coupled to the transformer, and (4) a bias circuit. The bias circuit includes (1) a bias transformer, (2) a switch coupled to the bias transformer, (3) a first blocking switch coupled to the bias transformer, (4) a first storage device coupled to the bias blocking device and across the bias transformer, and (5) an auxiliary bias circuit. The auxiliary bias circuit includes a second blocking device coupled to the bias transformer, and a second storage device, coupled to the second blocking device and across the bias transformer, that provides a voltage to drive an auxiliary load without requiring a separate power supply.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
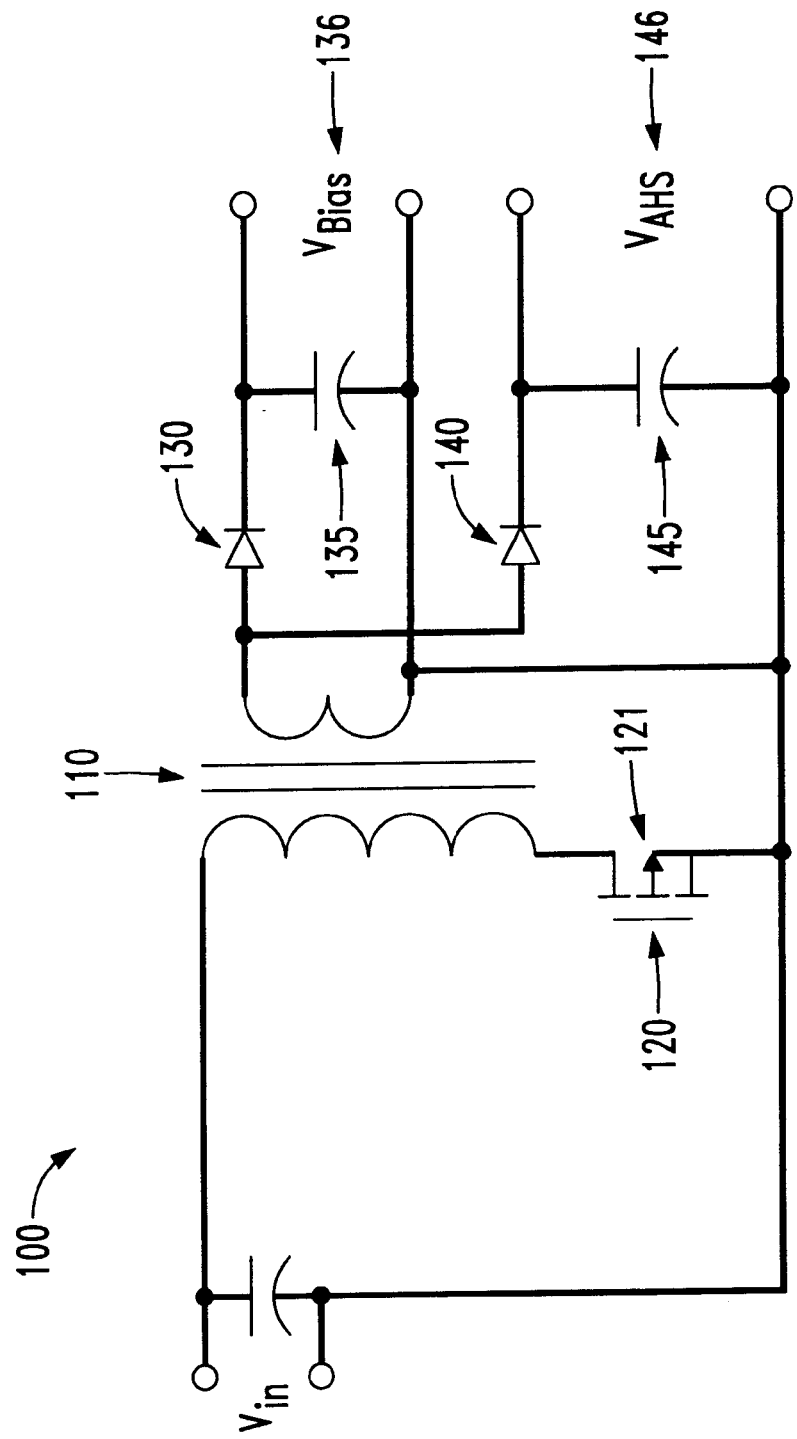
FIG. 1 illustrates a schematic diagram of a bias circuit including an auxiliary bias circuit constructed according to the principles of the present invention.

Referring initially to FIG. 1, illustrated is a schematic diagram of a bias circuit 100 including an auxiliary bias circuit constructed according to the principles of the present invention. The bias circuit 100 is coupled to an input voltage Vin and includes a bias transformer 110. A primary winding of the bias transformer 110 is coupled to a switch 120 that is driven by a self-pulsed gate-drive signal to a gate 121 of the switch 120. A secondary winding of the bias transformer 110 is preferably enhanced to augment the power delivery capability therefrom.

The bias circuit 100 also includes a first blocking device (e.g., a diode) 130 and first storage device (e.g., a capacitor) 135 coupled to the secondary winding of the bias transformer 110. The first blocking device 130 blocks the first storage device 135 from discharging back through the secondary winding of the bias transformer 110 thereby assuring that a bias voltage Vbias is delivered to a bias output 136. The bias output 136 furnishes power to operate, for instance, internal control, sense, feedback and other housekeeping circuitry.

The bias circuit 100 further includes the auxiliary bias circuit, coupled to the bias transformer 110, to power an auxiliary load. The auxiliary bias circuit includes a second blocking device (e.g., a diode) 140, coupled to the bias transformer 110, and a second storage device (e.g., a capacitor) 145, coupled to the second blocking device 140 and across the bias transformer 110. Of course, other blocking devices, such as a field-effect transistor, and storage devices, such as a battery, are well within the broad scope of the present invention.

An auxiliary bias output 146 of the auxiliary bias circuit is used to power an auxiliary load (e.g., an active cooling device) without requiring a separate power supply. Analogous to the first blocking device 130, the second blocking device 140 in the auxiliary bias circuit blocks the second storage device 145 from discharging back through the secondary winding of the transformer 110. The second blocking device 140 also isolates noise emanating from the circuitry powered by the bias voltage Vbias. The auxiliary bias circuit, as described herein, is provided by circuitry integral to the power supply (e.g., a board mounted power module) and can be used to power an auxiliary device without requiring an additional power supply.

Figure 2:
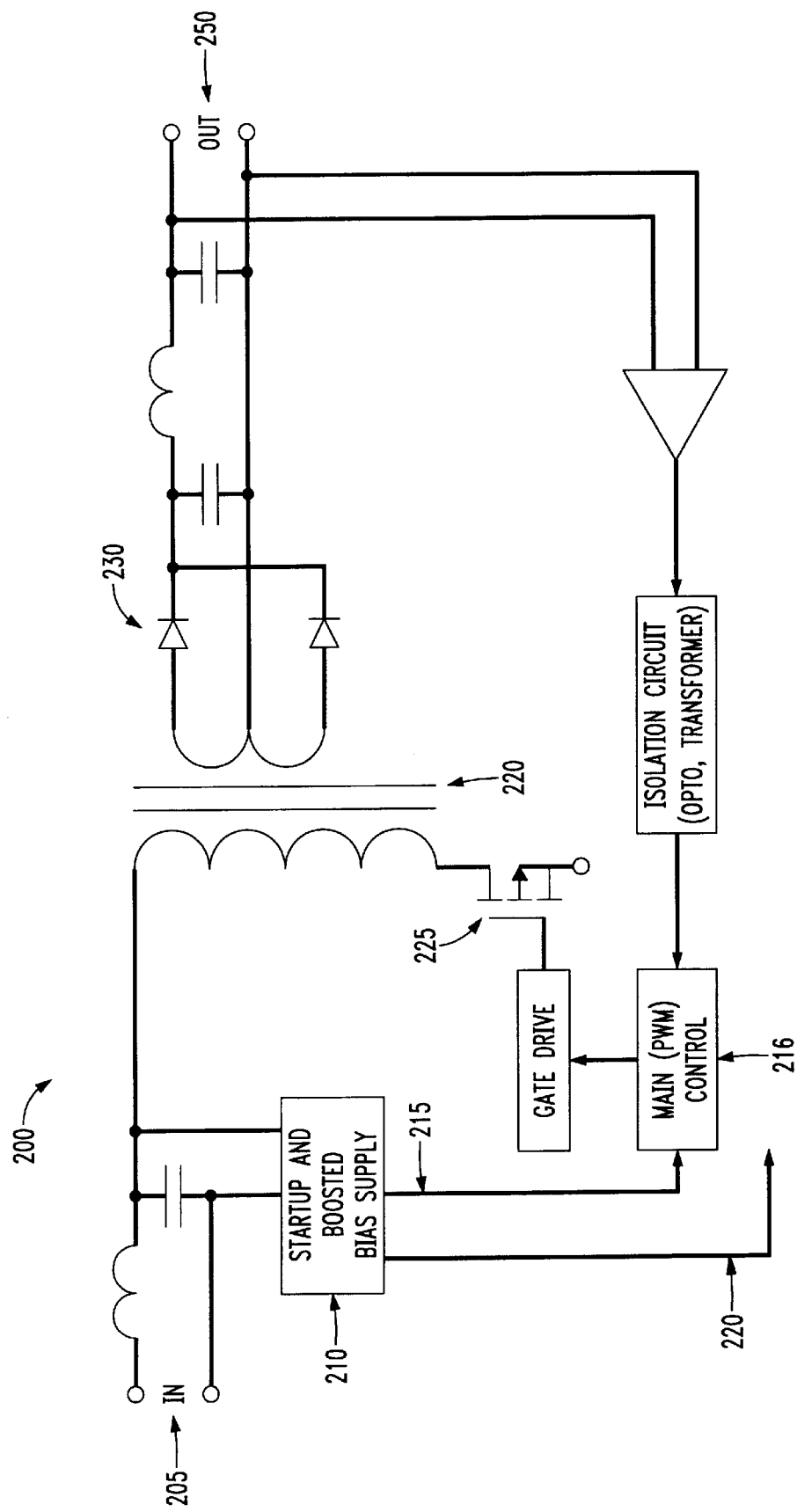
FIG. 2 illustrates a schematic diagram of a power supply constructed according to the principles of the present invention.

Turning now to FIG. 2, illustrated is a schematic diagram of a power supply (e.g., board mounted power module) 200 constructed according to the principles of the present invention. The power supply 200 includes a power train with an input 205 couplable to a source of power (e.g., DC source) and an output (e.g., DC output) 250 couplable to an electrical load.

A main switch 225, coupled to the input 205, controls the electrical input to a power transformer 220. A rectifier 230, coupled to the secondary side of the power transformer 220, provides a DC voltage at the output 250. The power supply 200 also includes a bias circuit 210 having an auxiliary bias circuit analogous to the bias circuit 100 illustrated and described with respect to FIG. 1. A bias output 215 of the bias circuit 210 provides bias voltage to the main control circuit 216 (including, for instance, a pulse-width modulator, internal feedback circuitry and protection circuitry) for the power supply 200. An auxiliary bias output 40 provides an auxiliary voltage to drive an auxiliary load without requiring a separate power supply. In order to provide an electrical connection for an auxiliary device powered by the auxiliary bias circuit, the power supply 200 may have pins or receptacles thereon to provide electrical connectivity to the auxiliary device. A person having ordinary skill in the art is familiar with the components and operation of power supplies and, as such, a detailed description thereof will not hereinafter be submitted.

In a preferred embodiment of the present invention, the auxiliary bias circuit provides voltage to drive an active cooling device for a heat sink assembly. Such an assembly can be top-mounted on the power supply (such as a board mounted power module) 200 to cool the power supply 200. An active cooling device is illustrated and described in Chen, et al.

Figure 3:
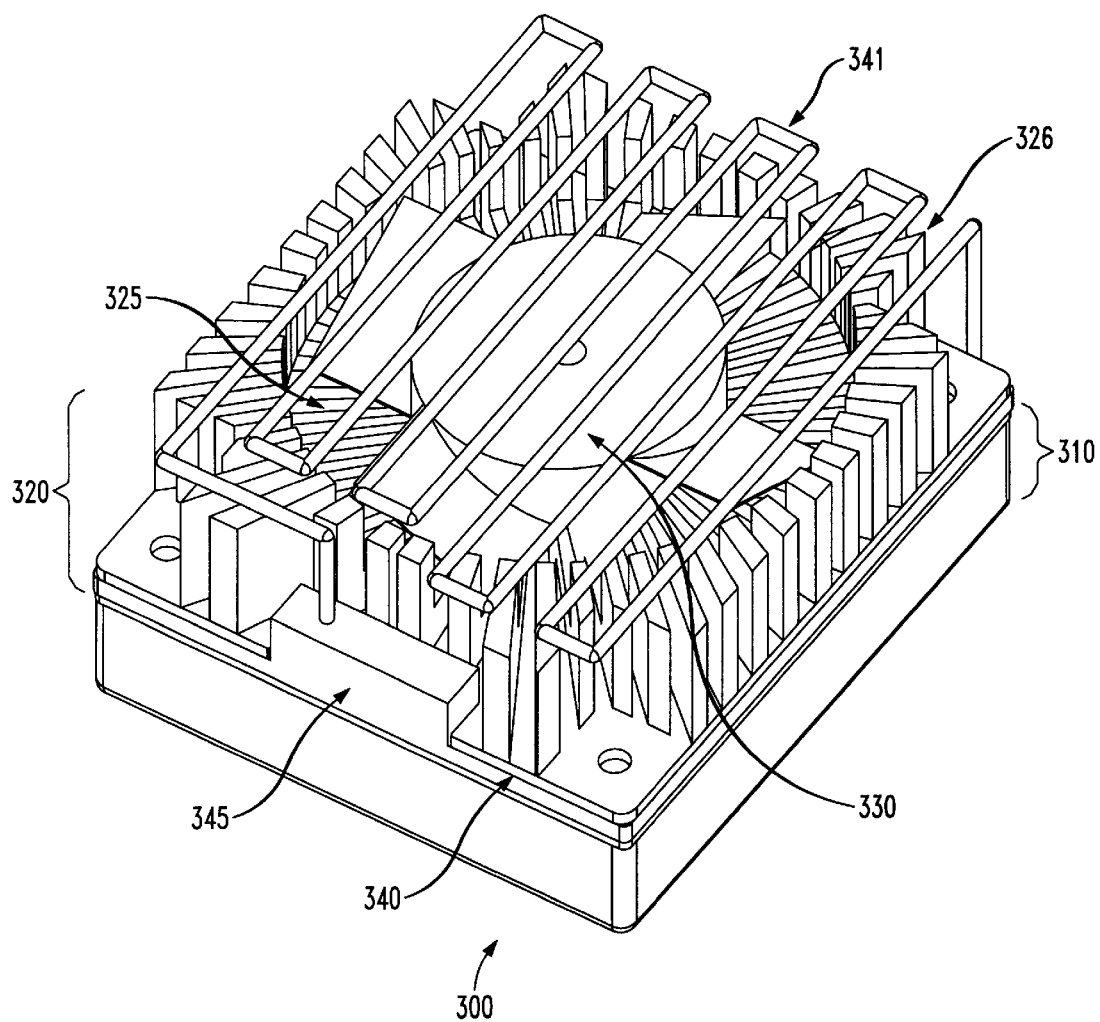
FIG. 3 illustrates an isometric view of a power supply with an active cooling device constructed according to the principles of the present invention.

Turning now to FIG. 3, illustrated is an isometric view of a board mounted power module 310 with active cooling device 320 constructed according to the principles of the present invention. An assembly 300 includes the board mounted power module 310 with a top-mounted active cooling device 320. The illustrated top-mounted active cooling device 320 includes a heat sink 325 with two active devices, namely, a fan 330 and circulating system for a liquid coolant. The liquid cooling system has a pump 345 that circulates liquid through pipes that run through a cold plate 340 mounted between the power module 310 and the heat sink 325. As the liquid circulates through the cold plate 340, it picks up heat from the power module 310 and then dissipates the heat into ambient air as it circulates through pipes 341 that run over the top of the heat sink 325 like a radiator. The active cooling device 320 also includes cooling fins 326 that transfer heat from the power module 310 to the ambient air. Of course, other active cooling devices such as a thermoelectric device and a fan, a stand alone liquid circulating pump with a nozzle, and an electrochemical pump with a heat sink are well within the broad scope of the present invention.

The illustrated fan 330 and liquid cooling system significantly improve the transfer of heat from the power module 310 thereby allowing the power module 310 to carry a significantly heavier electrical load (e.g., a 30% increase in capacity in some applications). In conjunction therewith, the active cooling device 320 significantly decreases the power module temperature (e.g., 20° C.) for a given output level for the power module 310. By employing the principles of the present invention, the power density, efficiency and reliability of the power module 310 can be enhanced without increasing the complexity of the circuit. The present invention permits auxiliary loads such as active heat transfer devices to operate from power supplied by an auxiliary bias circuit contained within the power module 310 without requiring an additional power source to furnish power to such devices.

For a better understanding of power electronics including power supplies and conversion technologies see *Principles of Power Electronics,* by J. G. Kassakian, M. F. Schlecht and G. C. Verghese, Addison-Wesley (1991). The aforementioned reference is herein incorporated by reference.

Those skilled in the art will understand that a number of presently known and later discovered active devices can be mounted on or associated with the board mounted power module and be within the scope of the current invention provided such devices are powered by the auxiliary bias power supply. Although the present invention has been described in detail, those skilled in the art should understand that they can make various changes, substitutions and alterations herein without departing from the spirit and scope of the invention in its broadest form.

What is claimed is:

1. For use in a power supply having a power transformer and a bias circuit with a bias transformer that is separate from said power transformer, an auxiliary bias circuit, comprising:

a blocking device coupled to said bias transformer; and a storage device, coupled to said blocking device and across said bias transformer, that provides a voltage to drive an auxiliary load without requiring a separate power supply.

2. The auxiliary bias circuit as recited in claim 1 wherein said bias circuit further comprises a switch and provides bias voltage to a main control circuit of said power supply.

3. The auxiliary bias circuit as recited in claim 1 wherein said blocking device is a diode.

4. The auxiliary bias circuit as recited in claim 1 wherein said storage device is a capacitor.

5. The auxiliary bias circuit as recited in claim 1 wherein said auxiliary load comprises an active cooling device for a heat sink assembly.

6. The auxiliary bias circuit as recited in claim 5 wherein said active cooling device comprises a fan.

7. The auxiliary bias circuit as recited in claim 5 wherein said active cooling device comprises a liquid cooling pump.

8. For use in a power supply having a power transformer and a bias circuit with a bias transformer that is separate from said power transformer, a method of providing power via an auxiliary bias circuit to an auxiliary load, comprising:

coupling a blocking device to said bias transformer; and providing a voltage via a storage device, coupled to said blocking device and across said bias transformer, to drive said auxiliary load without requiring a separate power supply.

9. The method as recited in claim 8 wherein said bias circuit further comprises a switch and provides bias voltage to a main control circuit of said power supply.

10. The method as recited in claim 8 wherein said blocking device is a diode.

11. The method as recited in claim 8 wherein said storage device is a capacitor.

12. The method as recited in claim 8 wherein said auxiliary load comprises an active cooling device for a heat sink assembly.

13. The method as recited in claim 12 wherein said active cooling device comprises a fan.

14. The method as recited in claim 12 wherein said active cooling device comprises a liquid cooling pump.

15. A power supply, comprising:

a power train having a input couplable to a source of electrical power and a DC output couplable to an electrical load, including:
a main switch coupled to said input,
a transformer coupled to said main switch, and
a rectifier coupled to said transformer; and a bias circuit, including:
a bias transformer,
a switch coupled to said bias transformer,
a first blocking device coupled to said bias transformer,
a first storage device coupled to said first blocking device and across said bias transformer, and
an auxiliary bias circuit, including:
a second blocking device coupled to said bias transformer, and
a second storage device, coupled to said second blocking device and across said bias transformer, that provides a voltage to drive an auxiliary load without requiring a separate power supply.

16. The power supply as recited in claim 15 wherein said first and second blocking devices are diodes.

17. The power supply as recited in claim 15 wherein said first and second storage devices are capacitors.

18. The power supply as recited in claim 15 wherein said auxiliary load comprises an active cooling device for a heat sink assembly.

19. The power supply as recited in claim 18 wherein said active cooling device comprises a fan.

20. The power supply as recited in claim 18 wherein said active cooling device comprises a liquid cooling pump.

* * * * *